US006161147A

United States Patent [19]

Snyder et al.

[11] Patent Number: 6,161,147

[45] Date of Patent: Dec. 12, 2000

[54] METHODS AND APPARATUS FOR MANAGING OBJECTS AND PROCESSES IN A DISTRIBUTED OBJECT OPERATING ENVIRONMENT

[75] Inventors: Alan Snyder, Palo Alto; Rod J. McChesney, Redwood City; Mark W. Hapner, San Jose; Arthur A. Van Hoff, Palo Alto, all of Calif.; Maurice Balick, Fairhaven, Md.; Rafael Bracho, Cupertino; David M. Brownell, Palo Alto, both of Calif.

[73] Assignee: Sun Microsystems, Inc., Palo Alto, Calif.

[21] Appl. No.: 08/414,923

[22] Filed: Mar. 31, 1995

[51] Int. Cl.[7] .......................... G06F 15/163; G06F 9/00; G06F 9/46

[52] U.S. Cl. .......................................................... 709/310

[58] Field of Search .............................. 395/150, 187.01, 395/680, 683, 185.08; 711/760; 709/100, 300, 303, 102, 310, 315

[56] References Cited

U.S. PATENT DOCUMENTS

| | | | |
|---|---|---|---|
| 4,967,353 | 10/1990 | Brenner et al. | 395/711 |
| 5,204,955 | 4/1993 | Kagei et al. | 395/185.08 |
| 5,241,673 | 8/1993 | Schelvis | 395/614 |
| 5,297,283 | 3/1994 | Kelly, Jr. et al. | 395/150 |
| 5,475,817 | 12/1995 | Valdo et al. | 345/150 |
| 5,553,239 | 9/1996 | Health et al. | 395/200 |
| 5,615,362 | 3/1997 | Jensen et al. | 395/614 |

FOREIGN PATENT DOCUMENTS 07049803 2/1995 Japan .

OTHER PUBLICATIONS

Synchronizing Win32 threads using critical sections, semaphores, and mutexes., Jeffrey Richter, Microsoft Systems Journal, v8, n8, p27.

Dealing with History and time in a distributed enterprise manager, A.A. Shvartsman, Digital Equipment Corp., Littleton, MA., IEEE Network, IEEE, v. 7, issue 6, pp. 32–42, Nov. 1993.

Jackson, Frank, Generation Scavenging, Dr. Dobbs, v15, n5, p1, May 1990.

Gabriel, Richard, Persistence in a Programming environment, Dr. Dobl's, Dec. 1966.

(List continued on next page.)

*Primary Examiner*—Alvin E. Oberley
*Assistant Examiner*—Peter Stecher
*Attorney, Agent, or Firm*—Beyer Weaver & Thomas, LLP

[57] ABSTRACT

A variety of methods and apparatus for managing deactivation and deletion of objects and server processes are taught. According to some embodiments of the present invention, a thread of execution termed the reaper thread systematically cycles through a computer process deactivating and/or deleting objects based upon a variety of criteria. One suitable criterion for object deactivation is based upon the amount of time lapsed since a client has requested services of the object. According to the timeout criterion, the reaper thread determines the period of time since the last client requested services from the object, compares this to a timeout value which may be defined by any suitable entity, and proceeds with deactivation and/or deletion accordingly. Object deletion may have a separate criterion or be specifically requested by a client. A deletion flag may be set to indicate that object deletion is requested. When an object has deactivated, the reaper thread further determines if the deletion flag for this object is set, and, if so, further proceeds to perform an object deletion operation. In some embodiments, the reaper thread is further responsible to shutdown the server process under which the reaper thread is executing. As is well known to those skilled in the art of object oriented programming, a thread of execution is essentially a sequential flow of the point of execution through a computer process. One suitable criterion for server process shutdown would be related to the server process activity.

2 Claims, 10 Drawing Sheets

OTHER PUBLICATIONS

IBM Technical Disclsoure Bulletin, "Safe Device Power Management," May 1993, vol. 36 No. 05, pp. 123–124.

IBM Technical Disclosure Bulletin, "Pop–Up Icon for Operation Event in Shared Applications," Jan. 1995, vol. 38, No. 01, pp. 1–2.

IBM Technical Disclosure Bulletin, "Mechanism for Dynamic Resource Management," Jan. 1995, vol. 38, No. 01, pp. 583–584.

Rao, Bindu R., C++ and the OOP Paradigm , 1993, published by McGraw–Hill Inc., pp. 165–171.

METHODS AND APPARATUS FOR MANAGING OBJECTS AND PROCESSES IN A DISTRIBUTED OBJECT OPERATING ENVIRONMENT

CROSS-REFERENCE TO RELATED APPLICATION

This application is related to co-pending patent application Ser. No. 08/414,240, filed simultaneously herewith, which is assigned to the assignee of the present application and is incorporated herein by reference in its entirety.

BACKGROUND OF THE INVENTION

The present invention relates generally to the management of active objects in distributed object based client/server computing systems. More specifically, the present invention teaches methods and apparatus for managing the activation, deactivation and deletion of objects and processes within a distributed object operating environment that utilizes a reaper to periodically check the status of the managed objects.

In the computer industry, there have been increasing efforts in recent years to provide distributed, object oriented operating environments which permit computers interconnected via a computer network to work together more efficiently. As used herein, the term "distributed object" or "object" refers to an encapsulated package of code and data that can be manipulated by operations through an interface. Thus, distributed objects will be seen by those skilled in the art of object oriented programming (OOP) as including the basic properties that define traditional programming objects. However, distributed objects differ from traditional programming objects by the inclusion of two important features. First, distributed objects are multilingual. That is, the interfaces of distributed objects are defined using an interface definition language (IDL) that can be mapped to a variety of different programming languages. One such interface definition language is Object Management Group's IDL. Second, distributed objects are location-independent, i.e., distributed objects can be located anywhere in a network. This contrasts sharply with traditional programming objects which typically exist in a single address space.

Distributed objects can be object clients or object servers, depending upon whether they are sending requests to other objects or replying to requests from clients. In a distributed object operating environment, requests and replies are made through an Object Request Broker (ORB) that is aware of the locations and status of the objects. One architecture which is suitable for implementing such an ORB is provided by the Common Object Request Broker Architecture (CORBA) specification which is incorporated herein by reference. The CORBA specification was developed by the Object Management Group (OMG) to define the distributed computing environment world in terms of objects in a distributed client-server environment, where server objects are capable of providing services to clients requesting the service. In the following discussion, the terms "object" and "distributed object" will be used interchangeably.

In any multi-purpose computer system, there is a limited amount of transient memory resources that may be allocated to the resources (e.g. objects and process(es)) that are active within the system. Therefore, there must be some mechanism through which such resources can be deactivated and/or deleted thereby freeing portions of the transient memory for use by other resources. In most personal computer systems, this is done by the user who simply manually deletes or deactivates resources that are not in use. However, such an approach is unsuited for distributed object based computing systems, since objects and processes may be initiated in response to calls received from remotely located clients. In larger systems, servers often run continuously as daemon processes that are started by the operating system during system initialization. As will be appreciated by those skilled in the art, the problem is amplified in distributed object based computing systems since objects and processes may be initiated in response to calls received from remotely located clients. Therefore, reasoned management of the active objects becomes a necessity.

SUMMARY OF THE INVENTION

To achieve the foregoing and other objectives and in accordance with the purpose of the present invention, methods and apparatus for managing objects and processes within a distributed object operating environment are taught. According to one embodiment of the present invention a computer system capable of executing a process includes a central processing unit, memory that is allocated to the process, an active object list resident in the memory, an object timeout variable arranged to store a designated object inactivity period, an object timer variable associated with the selected object and a deactivator for deactivating the selected object. The computer system elements have the following attributes. The active object list is arranged to identify objects that are active in the process. The designated object inactivity period value is associated with a selected object and further is indicative of a period of inactivity after which the selected object will be deactivated when the object is in an active state. The object timer variable is arranged to store a value that is suitable for use in determining whether the period of inactivity after which the selected object will be deactivated has been exceeded. The deactivator is arranged to perform the deactivation function when it is determined that the period of inactivity after which the selected object will be deactivated has been exceeded.

In a related embodiment, the computer system is capable of executing a multithreaded process and the computer system has a mutex associated with the active object list. The active object list mutex serves to synchronize access to the active object list as only the thread in possession of the active object list mutex may access the active object list. In some embodiments of the present invention, the object timeout variable and the object timer variable form a portion of the active object list. In further embodiments, each object entry in the active object list has an associated object timeout variable and an associated object timer variable. In another related embodiment, the computer system further has a deactivation pending list that identifies any objects that are ready to be deactivated. Additionally, the deactivator is arranged to only deactivate objects that are identified in the deactivation pending list.

In yet another related embodiment, the computer system further comprises a deletion flag associated with the selected object. The deletion flag is arranged to indicate whether its associated object is to be deleted.

In a separate embodiment of the invention, a computer system capable of executing a computer process includes a central processing unit, memory that is allocated to the process, a server timeout variable arranged to store a designated inactivity period value that is associated with the process, the designated inactivity period value being indicative of a period of inactivity after which the process will be deactivated, a server timer variable associated with the process and arranged to store a value that is suitable for use in determining whether the period of inactivity after which the server will be deactivated has been exceeded, and a deactivator for deactivating the server when it is determined that the period of inactivity after which the server will be deactivated has been exceeded.

In another embodiment of the present invention, a computer system capable of executing a multi-threaded process is disclosed. According to this embodiment, the computer system comprises a central processing unit, memory that is allocated to the process, an active object list resident in the memory, the active object list being arranged to identify objects that are active in the process, an active object list mutex that permits only one thread to access the active object list at any time, an object timeout variable arranged to store a designated server inactivity period value that is associated with the object, the designated object inactivity period value being indicative of a period of inactivity after which the object will be deactivated, an object timer variable associated with the object and arranged to store a value that is suitable for use in determining whether the period of inactivity after which the object will be deactivated has been exceeded, and a deactivator for deactivating the selected object when it is determined that the period of inactivity after which the selected object will be deactivated has been exceeded.

According to one aspect of the present invention, a computer implemented method of managing objects used in a process executing on a computer system is taught. Each managed object occupies memory allocated to the process and has an associated designated object inactivity period. The computer implemented method comprises the computer implemented steps of, for each managed object, periodically checking to determine whether the managed object has not been accessed within a period that exceeds the associated designated object inactivity period and deactivating managed objects that are determined to have not been accessed within a period that exceeds their designated inactivity period.

A related method aspect includes the computer implemented steps of periodically checking to determined whether the process has not been accessed within a period that exceeds a designated server inactivity period that is associated with the process, and deactivating the process when it is determined that the process has not been accessed within a period that exceeds the designated process inactivity period. In some embodiments, each managed object has an associated timeout variable arranged to store a value indicative of the associated designated object inactivity period, wherein when the value stored in a selected one of the timeout variables is set to a predetermined value, the associated object will not be deactivated based on inactivity.

In a separate method aspect of the present invention, a computer implemented method of managing objects used in a process executing on a computer system that has an active object list that identifies the managed objects is taught. Herein each managed object has an associated designated object inactivity period and an associated deletion flag having a state that indicates that the associated managed object has been marked for deletion. The method of the present aspect of the invention comprises the computer implemented steps of (a) for each managed object, checking to determine whether the managed object has not been accessed within a period that exceeds the associated designated object inactivity period, (b) designating for deactivation managed objects that are determined to have not been accessed within a period that exceeds their designated inactivity period by identifying the managed objects that are designated for deactivation on a deactivation pending list, (c) checking the status of the deletion flags associated with each of the objects in the deactivation pending list to determine whether their associated managed objects have been marked for deletion and freeing the memory associated with such managed objects, and (d) deactivating the managed objects that are identified in the deactivation pending list and are not marked for deletion. Furthermore, the method includes the step of periodically repeating steps (a)–(d).

In yet another separate method aspect of the present invention, a computer implemented method of managing objects is disclosed. In this aspect of the present invention the managed objects are for use in a process executing on a computer system that has an active object list that identifies the managed objects. Each managed object has an associated timeout variable arranged to store a value indicative of a designated object inactivity period and an associated timer variable arranged to store a value indicative of a time at which an activity checking period associated with which the managed object is initialized. The method comprises the computer implemented steps of (a) determining whether the value stored in the timeout variable associated with a selected object is set to predetermined value, wherein when the value stored in the associated timeout variable is set to a predetermined value, the associated object will not be deactivated based on inactivity, (b) checking the timer variable associated with a selected object to determine whether the associated timer variable is in an uninitialized state, wherein when the associated timer variable is found to be in the uninitialized state, the associated timer variable is initialized, and (c) determining whether the time that has elapsed since the timer variable associated with a selected object exceeds the designated object inactivity period associated with that selected object, wherein when the associated period for inactivity is exceeded, the associated object is designated for deactivation by identifying the selected object on a deactivation pending list. The method further teaches (d) repeating the necessary ones of steps (a)–(c) for each of the managed objects to determine whether any of the managed objects should be deactivated based on inactivity and (e) deactivating the managed objects that are identified in the deactivation pending list. Still further, the method teaches periodically repeating steps (d) and (e) while the process is active on the computer system.

BRIEF DESCRIPTION OF THE DRAWINGS

The invention, together with further objectives and advantages thereof, may best be understood by reference to the following description taken in conjunction with the accompanying drawings in which:

FIG. 5 shows a couple of paths of execution for the reaper thread to take when reaping objects based upon a time out criterion;

FIG. 6 shows a couple of paths of execution for the reaper thread to take when deactivating objects present in the deactivation pending list;

FIG. 8 shows a couple of paths of execution for the reaper thread to take when reaping a server based upon a time out criterion;

DETAILED DESCRIPTION OF THE INVENTION

I. Definition of Terms

Figure 1:
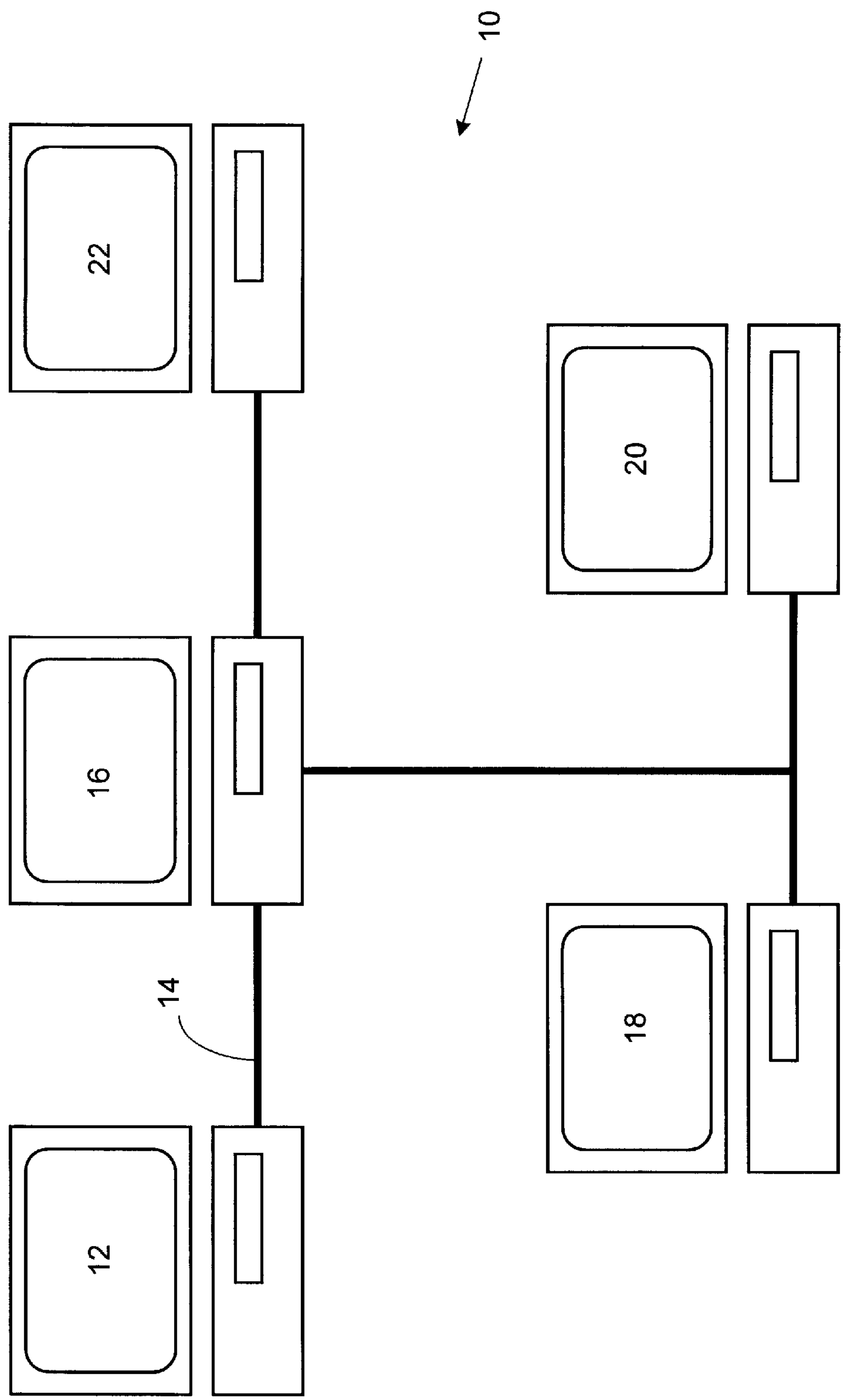
FIG. 1 is a pictorial illustration of various computers linked together in a computer network.

As used herein, the term "distributed object" or "object" refers to an encapsulated package of code and data that can be manipulated by operations through a defined interface that is associated with an object. Thus, distributed objects will be seen by those skilled in the art as including the basic properties that define traditional programming objects. However, distributed objects differ from traditional programming objects by the inclusion of two important features. First, distributed objects are multilingual. The interfaces of distributed objects are defined using an interface definition language that can be mapped to a variety of different programming languages. One such interface definition language is OMG's IDL. Second, distributed objects are location-independent, i.e., distributed objects can be located anywhere in a network. This contrasts sharply with traditional programming objects which typically exist in the same address space as the client. Distributed objects can be object clients or object servers, depending upon whether they are sending requests to other objects or replying to requests from other objects. Requests and replies are made through an Object Request Broker (ORB) that is aware of the locations and status of the objects.

A "distributed object system" or "distributed object operating environment" refers to a system comprising distributed objects that communicate through an ORB.

An "object reference" or "objref" is a value that contains a pointer or some other type of indirection to an object. The creation and definition of object references will be familiar to those skilled in the art.

A "client" as defined herein refers to an entity that sends a request to second object. In this model, the second object is referred to as a "server object" or a "target object". Thus, clients invoke operations, or implementations, from servers. In a distributed object environment, clients need not have knowledge of the implementation programming language, nor does the implementation have to have knowledge of the client's programming language due to the requirement of multilingual character of such objects. Clients and servers in distributed object environments need only communicate in terms of the interface definition language. As noted above, the request by the client to the server, and the server's reply to the client, is handled by the ORB. It should be pointed out that the client and server can exist within the same process, on the same host computer, or on two different host computers.

An "object interface" is a specification of the operations, attributes, and exceptions that an object provides. Preferably, object interfaces for distributed objects are written using an IDL. As noted above, objects perform services through their interfaces. The use of interfaces therefore relieves the need of clients to be aware of the programming languages used to define the methods and data of the objects in the service.

II. The Reaper Thread

According to some embodiments of the present invention, a thread of execution termed the reaper thread systematically cycles through a computer process deactivating and/or deleting objects based upon a variety of criteria. One suitable criterion for object deactivation is based upon the amount of time lapsed since a client has requested services of the object. According to the timeout criterion, the reaper thread determines the period of time since the last client requested services from the object, compares this to a timeout value which may be defined by any suitable entity, and proceeds with deactivation and/or deletion accordingly. Object deletion may have a separate criterion or be specifically requested by a client. A deletion flag may be set to indicate that object deletion is requested. When an object has deactivated, the reaper thread further determines if the deletion flag for this object is set, and, if so, further proceeds to perform an object deletion operation. In some embodiments, the reaper thread is further responsible to shutdown the server process under which the reaper thread is executing. As is well known to those skilled in the art of object oriented programming, a thread of execution is essentially a sequential flow of the point of execution through a computer process. One suitable criterion for server process shutdown would be related to the server process activity.

As will be appreciated by those skilled in the art, objects are instances of an object class activated in a server process. In particular, distributed objects are contemplated. Typically, distributed objects are implemented (by the ORB and/or the host computer) under computer processes. Computer processes provide a well known and common framework under which computer systems implement different threads of execution. By way of analogy, a computer process can be thought of as a domain partitioned within a computer system.

In actuality, a process typically includes address space (i.e. a portion of memory allocated to only the process), a set of file descriptors, a process identification number, and one or more threads of execution (often referred to as threads). Multi-threaded systems, such as contemplated by the present invention, allow for multiple threads to run concurrently in a single process. For a more detailed description of threads, multi-threaded processes, and principles of concurrency, please see "Concurrency Within DOE Object Implementations" by Dr. Robert Hagmann, Version 0.91, May 27, 1993, published by SunSoft and incorporated herein by reference in its entirety.

As a direct result of the framework of computer processes, all entities residing under a single process will share the process' limited resources (i.e. memory and files). Thus multiple distributed objects residing in a single process will have efficient communications via local transport. Furthermore, data can be loaded into memory that all objects residing in the single process will have direct access to. However, programmers may have other motivations (beyond efficient transport and data sharing) which negate the advantages gained by having many objects in a single process. For instance, different objects will have different objectives and may rely on different assumptions about the process. These motivations generate a need for orderly, multi-process distributed object operating environments as disclosed by the present invention. In allowing programmers to keep objects within separate processes, the ORB may prevent conflict between and maintain the integrity of objects within processes. As a case in point, an object in a first server process may go into an error condition and begin chaotically writing within its server process memory. Nevertheless, objects running in separate server processes will remain intact since these processes have their own memory, files, and flow control. Thus, in certain embodiments of the present invention, each server process will include its own reaper thread. However, the methods and apparatus of the present invention are also well suited for use in a single process operating environment.

In a preferred embodiment of the present invention, distributed objects and computer processes are resident on one or more computers linked together by a network. The network may take any suitable form. By way of example, a representative network arrangement 10 is illustrated in FIG. 1. The network arrangement 10 includes a first computer 12 which is coupled to a transmission line 14. The network 10 further includes a server, router or the like 16 in addition to other computers 18, 20, and 22 such that data and instructions can be passed among the networked computers. The design, construction and implementation of computer networks will be familiar to those of skill in the art.

Figure 2:
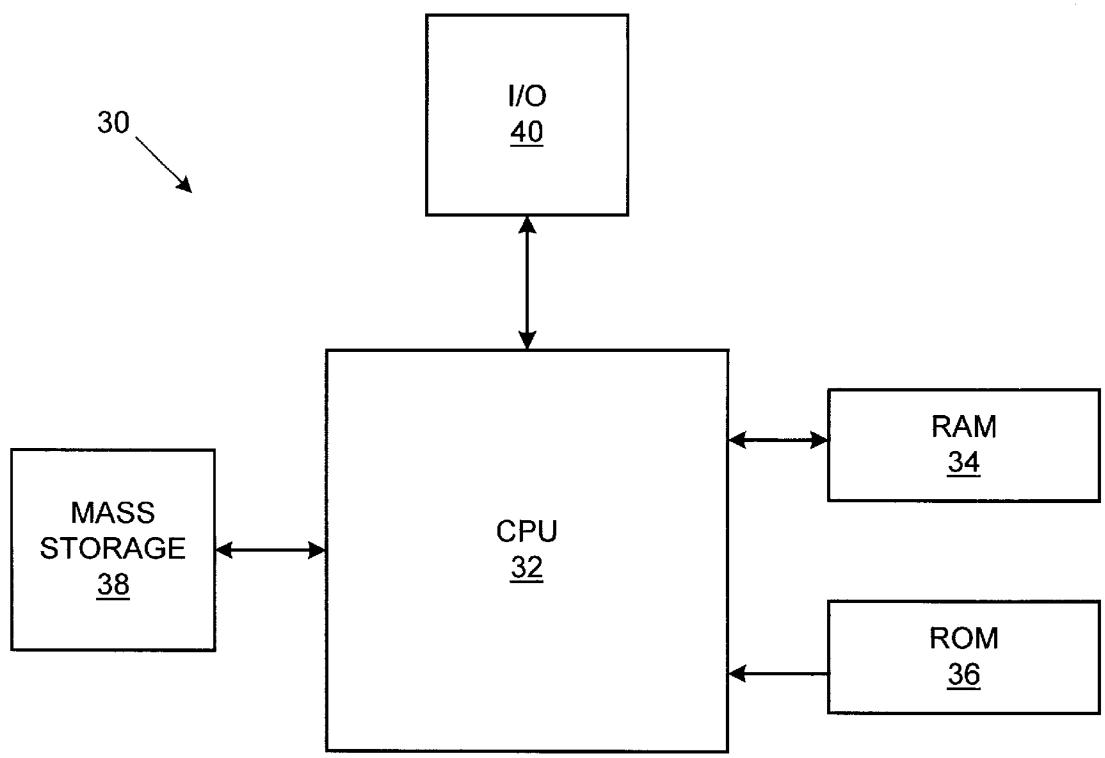
FIG. 2 illustrates diagrammatically the major components of a computer in FIG. 1.

A representative computer 30 suitable for use as computers 12, 18, 20, and/or 22 of FIG. 1 is illustrated schematically in FIG. 2. Computer 30 includes a central processing unit (CPU) 32 which is coupled bidirectionally with random access memory (RAM) 34 and unidirectionally with read only memory (ROM) 36. Typically, RAM 34 is used as a "scratch pad" memory and includes programming instructions and data, including distributed objects and their associated code and state, for processes currently operating on CPU 32. ROM 36 typically includes basic operating instructions, data and objects used by the computer to perform its functions. In addition, a mass storage device 38, such as a hard disk, CD ROM, magneto-optical (floptical) drive, tape drive or the like, is coupled bidirectionally with CPU 32. Mass storage device 38 generally includes additional programming instructions, data and objects that typically are not in active use by the CPU, although the address space may be accessed by the CPU, e.g., for virtual memory or the like. Each of the above described computers optionally includes an input/output source 40 that typically includes input media such as a keyboard, pointer devices (e.g., a mouse or stylus) and/or network connections. Additional mass storage devices (not shown) may also be connected to CPU 32 through a network connection. It will be appreciated by those skilled in the art that the above described hardware and software elements, as well as the networking devices, are of standard design and construction, and will be well familiar to those skilled in the art.

Figure 3:
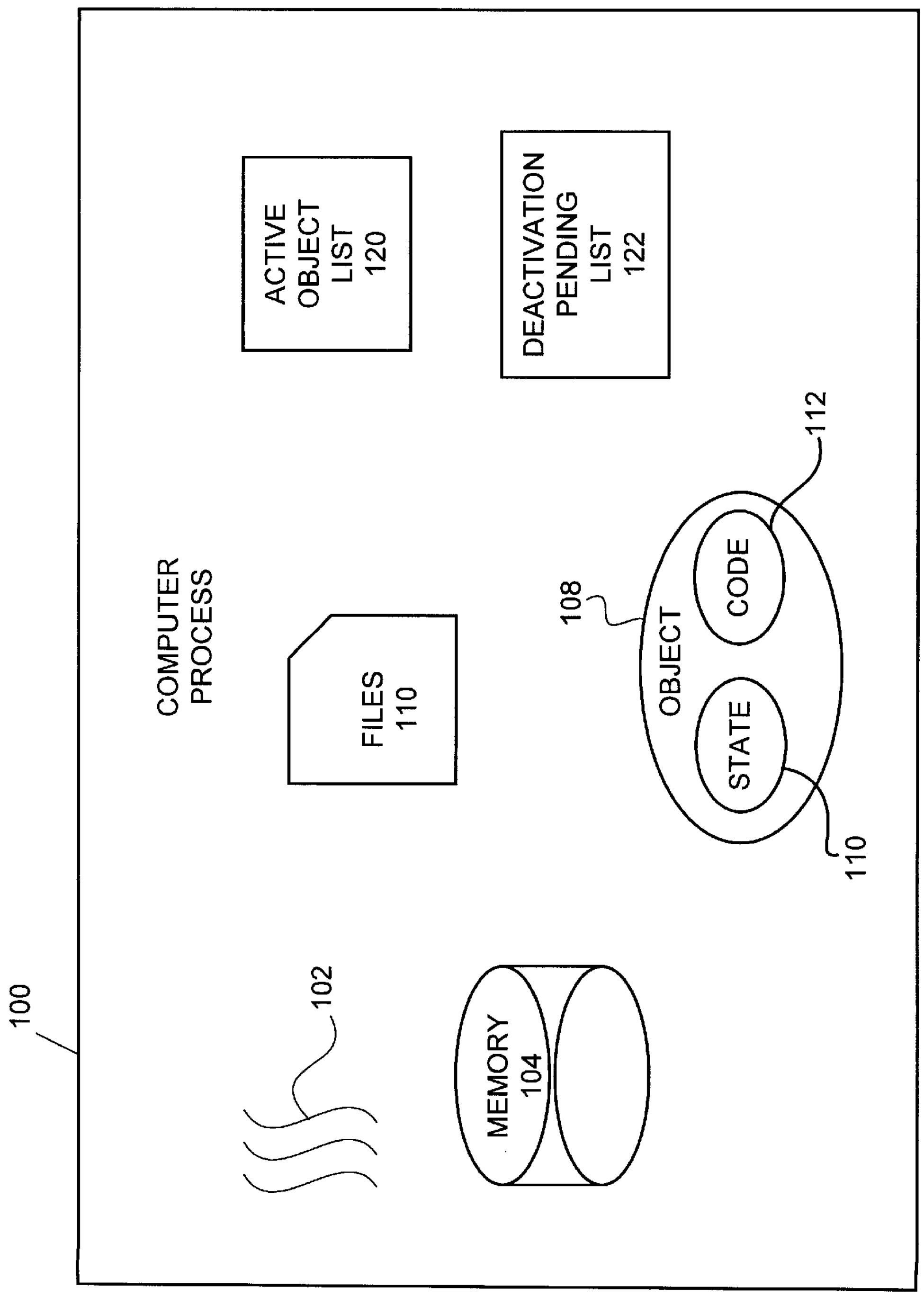
FIG. 3 is a pictorial illustration of a computer process in accordance with one embodiment of the present invention, wherein the computer process has multiple threads of execution, file identifiers, memory allocation, an object resident therein, an active object list, and a deactivation pending list.

FIG. 3 illustrates a multi-threaded process 100 in accordance with one embodiment of the present invention. The process 100 may be implemented on a computer such as computer 30 and includes multiple threads such as thread 102, allocated memory 104 which may include both persistent and transient memory, file identifiers 106, at least one object such as object 108, and active object list 120, and a deactivation pending list 122. When the server process 100 is activated, the server memory 104 is allocated, the server process 100 is registered with the Object Request Broker, and any other activation functions are performed. For a more detailed description of server process activation, as well as other methods and apparatus related to server process management in a distributed object operating environment, please see Menges et. al's copending U.S. patent application Ser. No. 08/408,245 entitled "METHODS AND APPARATUS FOR MANAGING COMPUTER PROCESSES" which is incorporated herein by reference in its entirety.

The object 108 includes state 110 and code 112. The object 108 is typically defined by the state 110 and the code 112. Code 112 is essentially the operating instructions by which the object executes. State 110 is thus the remaining portion which is not executable code. When an object is activated (or created), the memory for the instance variables (i.e. the state) is allocated and any necessary activation functions are performed. At this point the object 108 is ready to accept client requests for services. For a more detailed description of object activation, as well as other methods and apparatus related to object management, please see Brownell et. al.'s copending U.S. patent application Ser. No. 08/408,954 entitled "METHODS, APPARATUS, AND DATA STRUCTURES FOR MANAGING OBJECTS" which is incorporated herein by reference.

In one embodiment of the present invention, the active object list 120 is a list having a pointer for each active object. The deactivation pending list 122 is a list having a pointer for each active object which is "marked" for deactivation. The active object list 120 and the deactivation pending list 122 may be used by the reaper thread during its cycle in the following manner. The reaper thread will work its way through the active object list 120 evaluating each of the objects present. When an object present in the active object list 120 is determined to need "reaping", the reaper thread will add the object to the deactivation pending list 122. After evaluating each of the objects present in the active object list 120, the reaper thread will then go through the deactivation pending list 122, initiating deactivation when appropriate, and also removing from the deactivation pending list 122 any objects which have completed deactivation.

Referring next to FIGS. 4–9, a process suitable for managing the deactivation and deletion of objects and server processes in accordance with one embodiment of the present invention will be described. In this embodiment, a reaper thread is used to periodically check the status of the objects that are active within a particular process as well as the process itself. For each object that is active within a process, the reaper determines whether the object has been accessed within a predetermined designated period that is associated with the object. If an object has not been accessed within the designated period, the object is marked for deactivation. At an appropriate time (which may be after all or a number of the objects in a process have been checked) the reaper thread proceeds to deactivate the objects marked for deactivation. The reaper thread can also check the status of the process itself, to provide a mechanism for shutting down processes that are not currently being used. In the embodiment described, the reaper takes the form of a dedicated thread of execution and acts solely on the objects within a single process. Accordingly, each server process may be provided with its own reaper thread. In alternative embodiments, a single reaper could be designed that reaps a number of processes and/or the reaper thread of execution could be arranged to perform other tasks as well.

Figure 4:
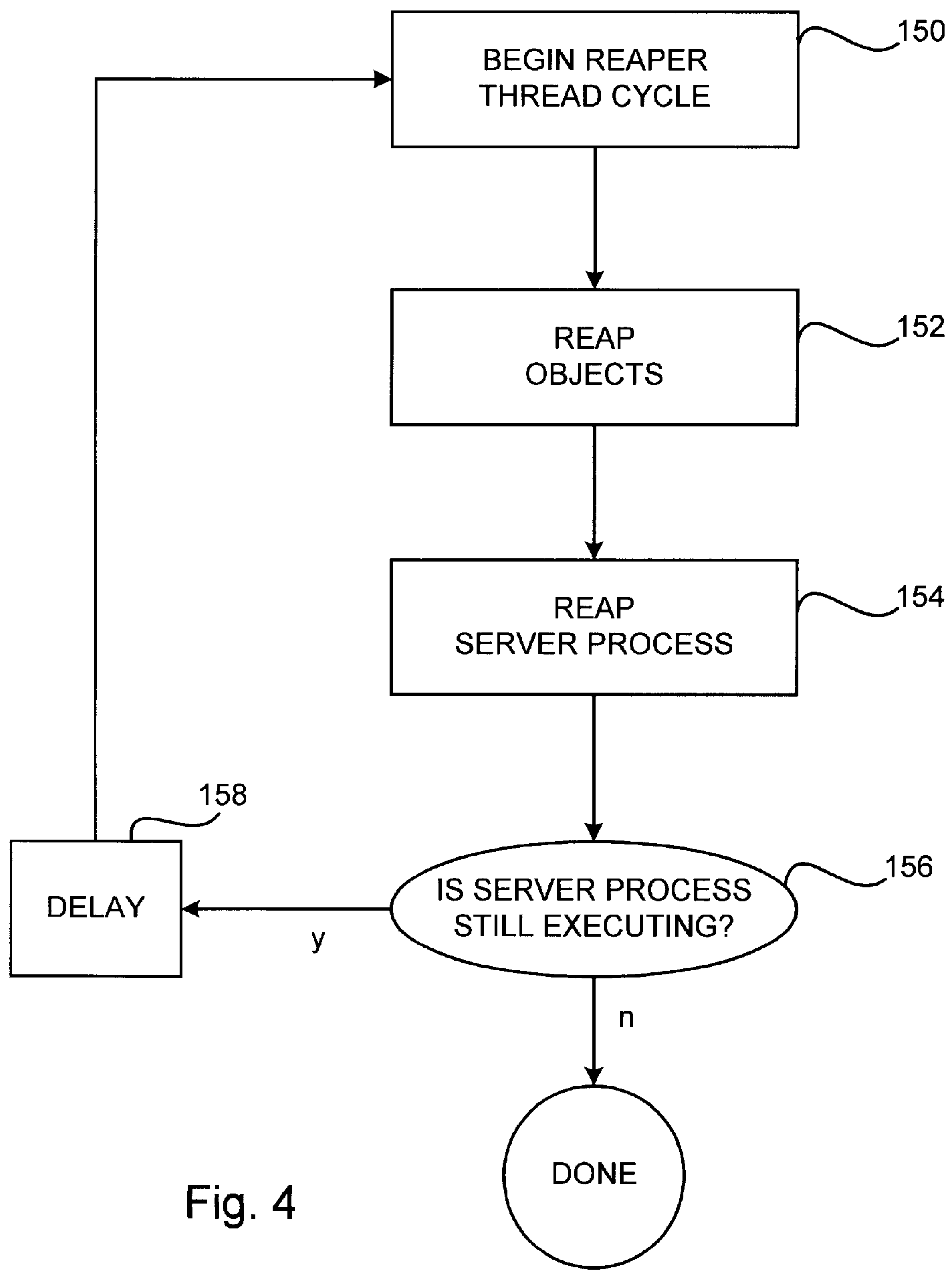
FIG. 4 is a flow chart illustrating an execution cycle of a reaper thread of execution in accordance with one aspect of the present invention.

Referring next to FIG. 4, the activity cycle of a dedicated reaper thread that reaps a single process will be described.

The reaper thread's activity begins at step 150. Initially, the thread is used to reap the objects that are active within the process in step 152. In effect, the reaper thread will check each of the objects to determine whether it has been utilized within a designated amount of time. In the described embodiment, each object has an associated designated access period that indicates the amount of time the object must be inactive before it is automatically deactivated by the reaper. If a particular object hasn't been accessed within its designated access period, it will be marked for deactivation, as will be described in more detail below with reference to FIG. 5. After all of the objects have been reaped in step 152, the reaper thread moves to step 154 where it reaps the process. In effect, the reaping of the process checks to determine whether the process has been accessed within an associated designated server access time period and if not, the server is shutdown. After the server process has been reaped in step 154, there are two possible outcomes as illustrated by step 156. If in step 154 the server process was shutdown then it will no longer be executing and the reaping is completed. On the other hand, when the server process has not been shutdown, the reaping cycle will be repeated after a suitable delay as illustrated by step 158. The reaper thread will then continue to cycle through the objects and process as long as the server process is active.

Figure 5:
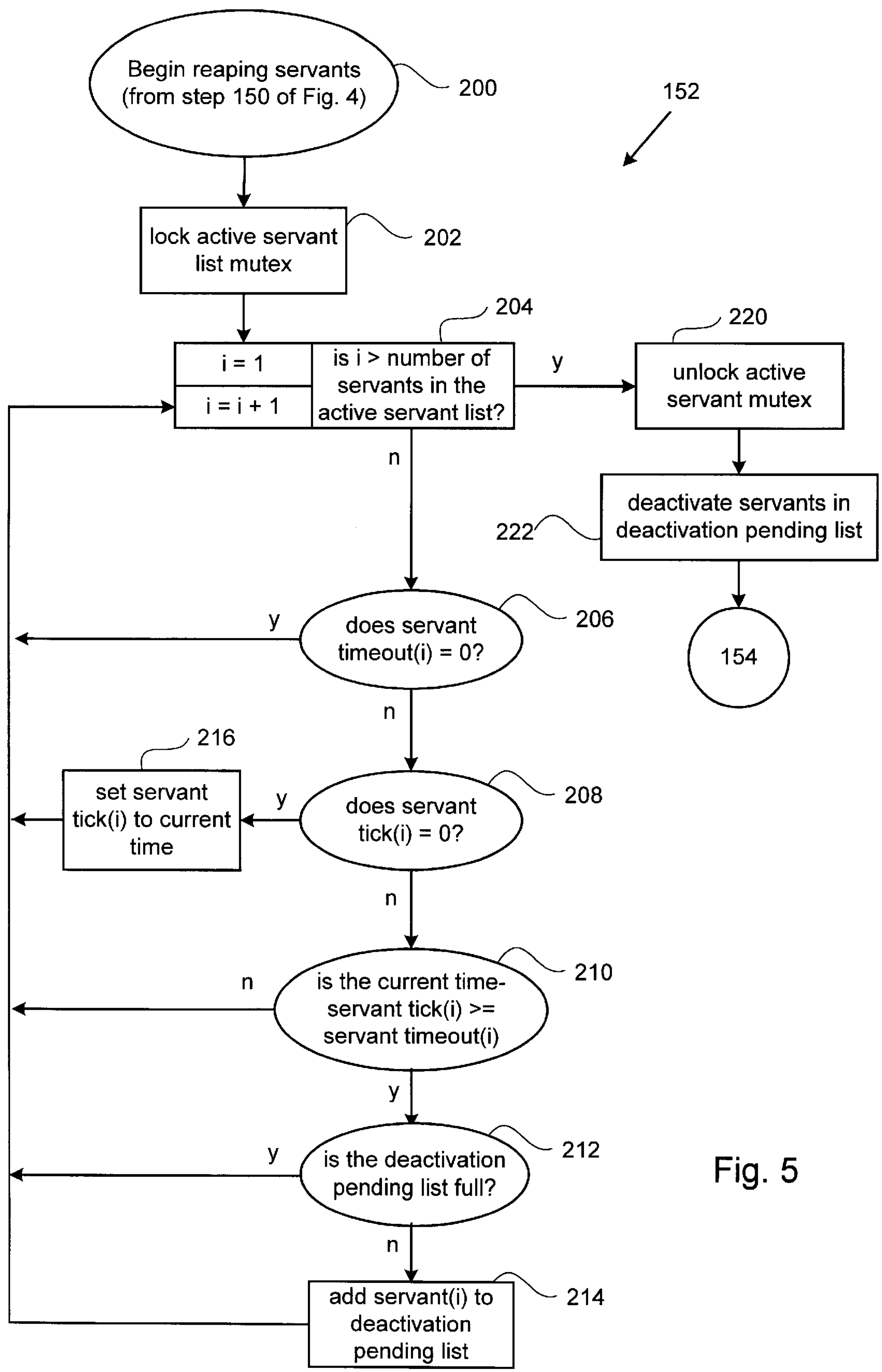
FIG. 5 is a flow chart illustrating in more detail one embodiment of step 152 of FIG. 4, specifically.

Referring next to FIG. 5, the object reaping step 152 of FIG. 4 will be described in more detail. Initially, in step 202, the reaper thread will acquire an active object list mutex. The active object list mutex prevents other threads from accessing the active object list simultaneously with the reaper thread which helps prevent concurrency problems. This is because only the thread owning the active object list mutex may access the active object list. It should be appreciated that if the active object list mutex is locked when it is initially accessed by the reaper thread, the reaper thread will merely wait in a sleep state until the mutex is released, at which point the reaper thread will wake possessing the active object list mutex. In any event, after the active object list mutex has been locked by the reaper thread, the reaper thread will proceed to reap all of the objects listed in the active object list.

In the flow chart shown, the reaping of the objects is illustrated by way of the loop created by steps 204–214. Thus, step 204 merely illustrates the constraints of the loop which essentially require that the reaper thread reap each of the objects in the active object list. Initially, in a step 206, the reaper thread determines whether a object time out variable (object timeout (i)) that is associated with the first object (object(i)) is set to zero. In the notation of the flow chart, the counter "i" is set to unity for the first object and thus the first checked object timeout is object timeout (1). When the object time out variable is set to zero (or another suitable predetermined number) the associated object will not be deactivated regardless of how long it has been since it was accessed. Accordingly, if the value of the object time out variable is set to zero for the first object, the logic control returns to step 204 where the counter (i) is incremented and the reaping process is repeated for the next object listed in the active object list.

When the object time out variable (object timeout (i)) for object (i) is not set to zero, the reaper proceeds to step 208 where it is determined whether a timer variable (object tick (i)) associated with the same object (i.e. object (i)) is set to zero. The object timer variable is typically set to zero by two separate occurrences. Initially, when an object is activated, the object timer variable is set to zero. Additionally, each time that the object is accessed, the object timer variable is reset to zero. Thus, a zero value in the object timer variable indicates that this is the first pass of the reaper since the object was either activated or invoked. Accordingly, when it is determined in step 208 that this is the first pass of the reaper since an access or an activation, the reaper proceeds to step 216 where the timer variable associated with the object (i.e. object tick (i)) is set or reset to indicate the current time. After the timer variable has been set to the current time in step 216, the logic returns to step 204 for processing of the next entry in the active object list.

When it is determined in step 208 that the timer variable associated with the current object is not set to zero, the reaper proceeds to step 210 where it is determined whether the object has been inactive for a period of time which exceeds its permissible limit. This is accomplished by subtracting the value stored as object tick (i) from the current time and determining whether the difference is greater than the designated access period as indicated by the value in the object time out (i) variable. If the object's time out limit has not been exceeded, then the logic again returns to step 204 where analysis of the next object in the active object list begins.

If it is determined in step 210 that the designated access period associated with the object has been exceeded, the reaper proceeds to step 212 where it determines whether a deactivation pending list is full. If the deactivation pending list is already full then it is impossible to add any additional objects to the list during this pass and the logic will again return to step 204 so that it can look at the next entry in the active object list. It should be appreciated that in the described embodiment, the reaper thread will continue its analysis of all active objects. However, since the deactivation pending list is known to be full, in alternative embodiments, it may be desirable to skip steps 210–214 during the processing of additional objects since even if they have timed out they cannot be added to the deactivation pending list. Typically, the deactivation pending list will be large enough so that overflows are very unlikely. The actual size of the deactivation pending list may vary widely in accordance with the needs of any particular system. In other embodiments, it may be appropriate to design the deactivation pending list to be able to vary in size, thereby avoiding a situation wherein the deactivation pending list is full.

When it is determined in step 212 that the deactivation pending list is not full, then the reaper thread proceeds to step 214 where the object which has been inactive for an extended period is added to the deactivation pending list. After the object (i) has been added to the deactivation pending list, the reaper returns to step 204 where it begins its analysis of the next entry in the active object list. After all of the entries in the active object list have been processed, the reaper thread will proceed to step 220 where the active object list mutex is unlocked. This permits other threads to access the active object list as required. After the active object list mutex has been unlocked and released, the reaper proceeds to step 222 where it deactivates the objects listed in the deactivation pending list (deleting the deactivated objects when appropriate) as will be described in more detail below with reference to FIG. 6. After the appropriate objects have been deactivated, the reaper proceeds to step 154 of FIG. 4 where it reaps the server process as will be described in more detail below with reference to FIG. 8.

Figure 6:
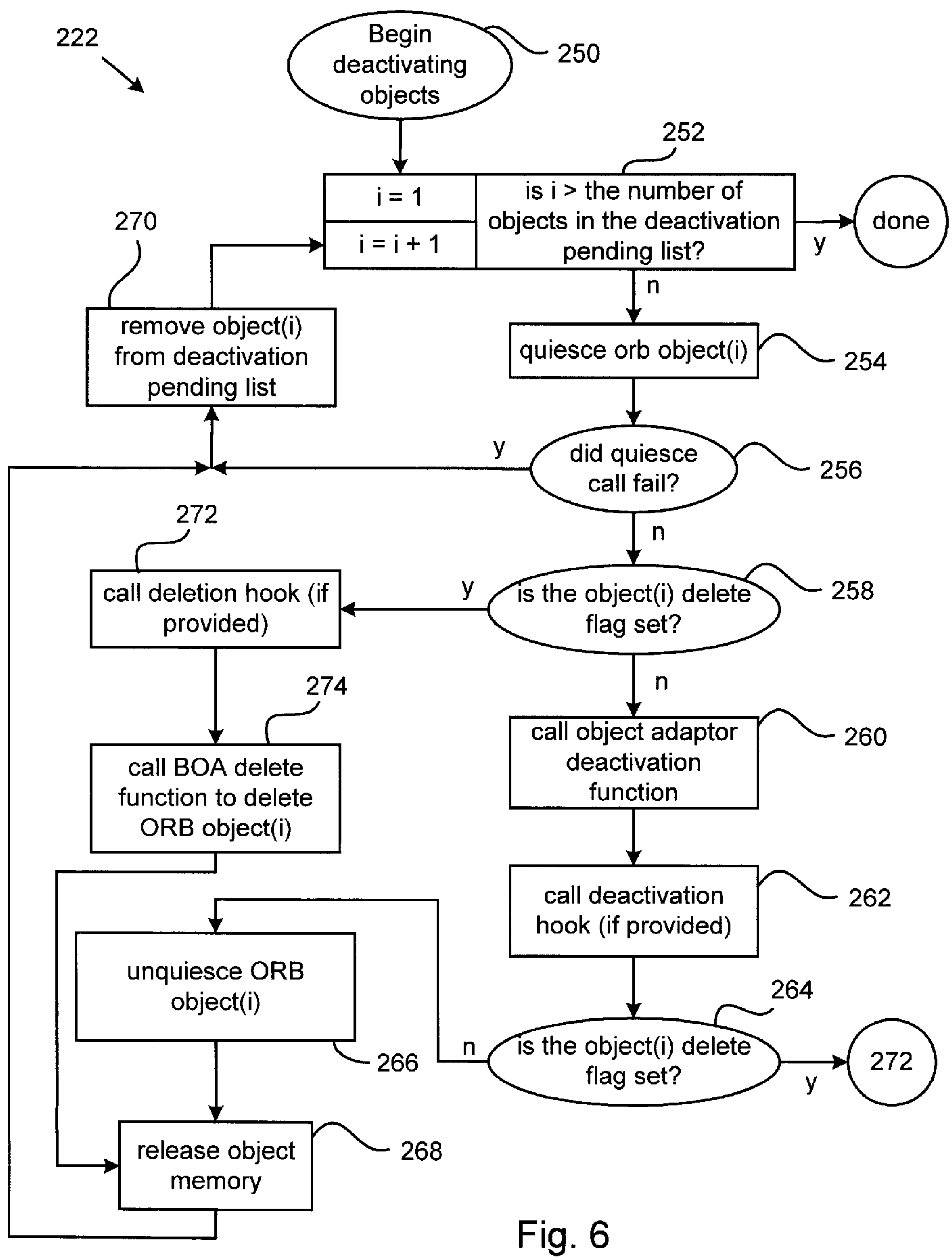
FIG. 6 is a flow chart illustrating in more detail one embodiment of step 222 of FIG. 5, specifically.

Referring next to FIG. 6, the deactivation objects step 222 of FIG. 5 will be described in more detail. In the flow chart of FIG. 6, the reaper deactivation cycle is illustrated by way of the loop created with steps 252–270. Step 252 merely illustrates the constraints of the loop which essentially require that the reaper thread process each of the objects present in the deactivation pending list. Initially, in a step 254, the reaper quiesces an object (object (i)) in the deactivation pending list that is associated with the first object (object(i)). In the notation of the flow chart, the counter "i" is set to unity for the first object in the deactivation pending list and thus the first object quiesced is object (1). When quiesced, the object will no longer receive requests from remote clients.

After performing a quiesce call in step 254, in a step 256 it is determined if the quiesce call failed. If the call failed, this typically indicates that the object has already been deactivated. Thus if the call failed, the deactivation method 222 proceeds in a step 270 where the reaper thread removes object (i) from the deactivation pending list and then control is returned to step 252 where the counter "i" is incremented by unity and either the object deactivation loop is completed or the next object in the deactivation pending list is processed.

If the quiesce call succeeds, control proceeds to a step 258 where it is determined if a object delete flag (i) is set. The object delete flag (i) is set to indicate that the object (i) is to be deleted (as opposed to just deactivated). Additionally, the object delete flag (i) will prevent new clients from using the object if it is set. Typically the object delete flag (i) is initialized when the object is activated in the process. When the object delete flag (i) is not set, control proceeds to a step 260 where the Object Adapter deactivation function is called which alters an object adapter state to indicate that a subsequent request to the object requires the object to be activated. Next, in an optional step 262, a deactivation hook is called. The deactivation hook may be provided by any suitable entity such as the object developer and may be provided by a couple of different entities. In step 262 any steps which the object developer requires the object to perform at deactivation should be performed. By way of example, if the object implements its own persistent storage mechanism, the deactivation hook is an appropriate location to place operations which would perform storage and cleanup of the object's persistent data. After executing the deactivation hook in step 262, in a step 264 the reaper thread checks again to determine if the object delete flag (i) is set. Step 264 is included as the deactivation hook may have set the flag.

If in step 264 it is determined that the object delete flag (i) is not set, then control proceeds to a step 266 where the object is unquiesced. Then, in a step 268, the reaper thread releases the server process memory which has been allocated to the object (i), thereby making the resources available to other entities. One embodiment of step 268 will be described in more detail below with reference to FIG. 7. After the object (i) memory has been released within the server process, object (i) is removed from the deactivation pending list in a step 270 and process control is passed back to step 252 wherein the counter "i" is incremented and, depending upon the value of "i", the deactivation cycle proceeds either to process the next object in the deactivation pending list or to step 154 of FIG. 4.

Traveling across the YES branches of decision steps 258 or 264 (i.e. the object delete flag (i) is set) the flow of execution proceeds with a step 272 where a deletion hook is executed. The deletion hook is optionally provided by any suitable entity such as the object developer and typically performs tasks which the object developer desires to have performed prior to object deletion. Then, in a step 274, the reaper thread calls the Object Adapter delete function to delete the object (i). After step 274, the object (i) is no longer available to clients and further cannot be activated. Subsequent to step 274, the reaper thread proceeds to execute the steps of reclaiming object memory for object(i), and removing the object (i) from the deactivation pending list 270. These steps are performed identical to the description in the preceding paragraph; therefore no further discussion is provided.

Figure 7:
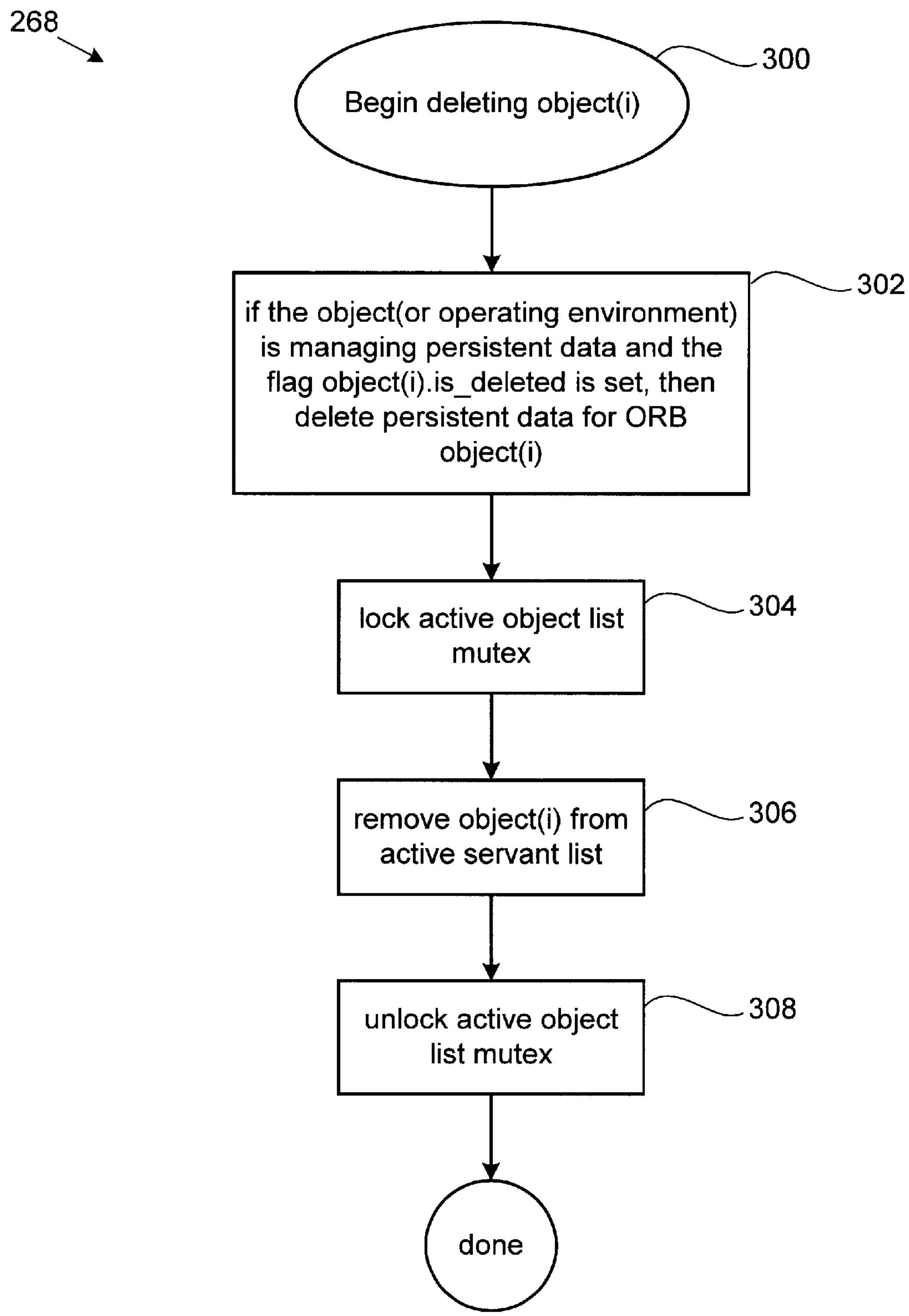
FIG. 7 is a flow chart illustrating in more detail one embodiment of the object memory reclamation step 268 of FIG. 6.

Referring next to FIG. 7, one embodiment of the reclaim object (i) memory step 268 will be described in more detail. In an initial step 300, the reaper thread begins the reclamation method. In an optional step 302, when it is determined that (1) the object has persistent data and (2) the object delete flag (i) is set, then the persistent data associated with the object is deleted. One suitable method for transparently incorporating persistent data into an object is described in Hapner et. al.'s copending U.S. patent application Ser. No. 08/414,770 entitled "METHODS AND APPARATUS FOR PROVIDING TRANSPARENT PERSISTENCE IN A DISTRIBUTED OBJECT OPERATING ENVIRONMENT" which is incorporated herein by reference in its entirety. One suitable method for managing persistent data for a plurality of objects is described in Hapner et. al.'s copending U.S. patent application Ser. No. 08/414,119 entitled "METHODS AND APPARATUS FOR MANAGING A DATABASE IN A DISTRIBUTED OBJECT OPERATING ENVIRONMENT" which is incorporated herein by reference in its entirety. Note that if the object implements its own mechanism for maintaining persistent data, then the process of deleting persistent data may be best performed in the deletion hook execution step 272 of FIG. 6.

In a next step 304, the reaper thread lozks the active object list mutex. As discussed previously, when the active object list mutex is locked, the active object list can only be accessed by the thread in possession of the corresponding mutex, which in this case is the reaper thread. Once the mutex is acquired the reaper thread deletes the object (i) from the active object list in a step 306 and subsequently, in a step 308, unlocks the active object list mutex.

Figure 8:
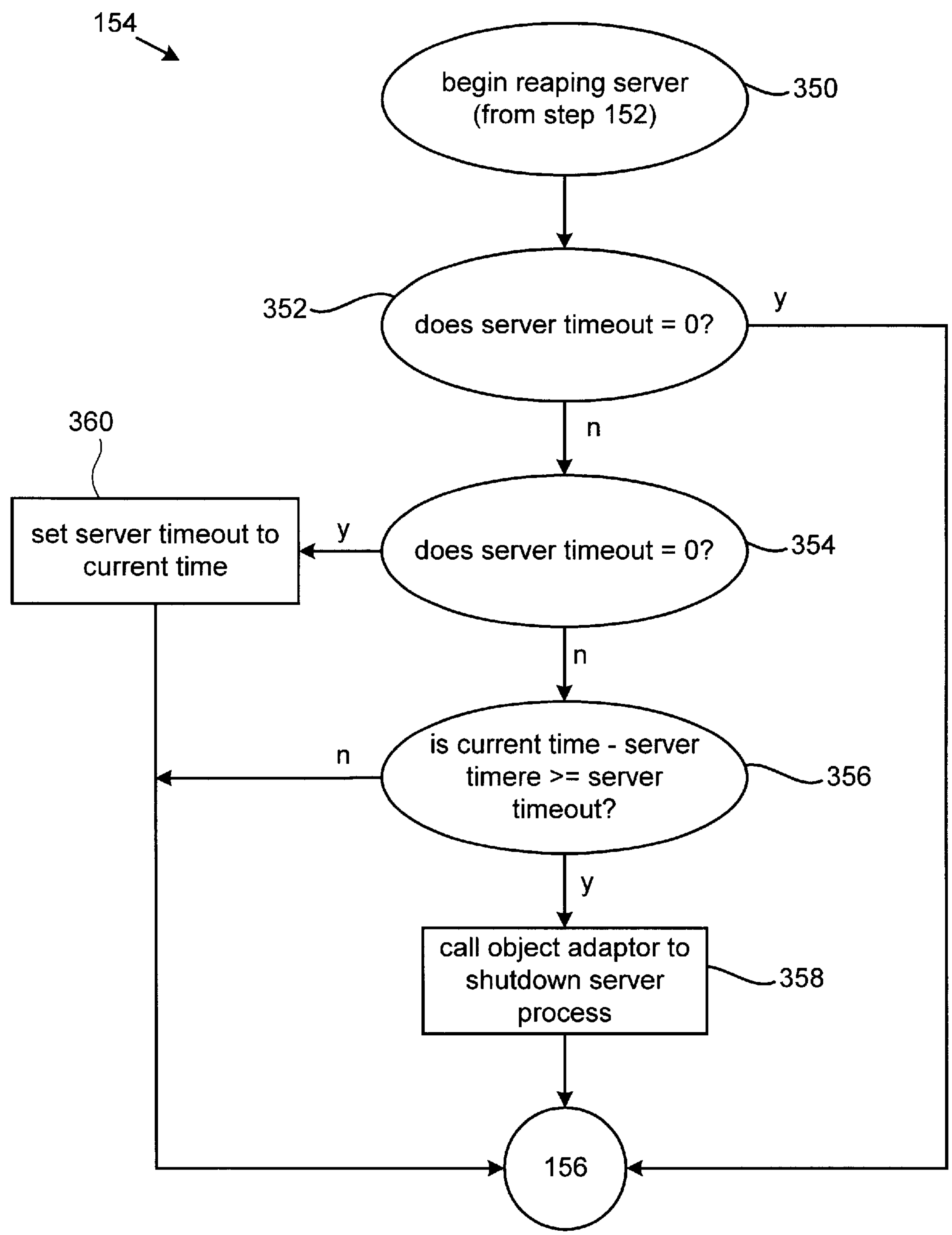
FIG. 8 is a flow chart illustrating in more detail one embodiment of step 154 of FIG. 4, specifically.
Figure 9:
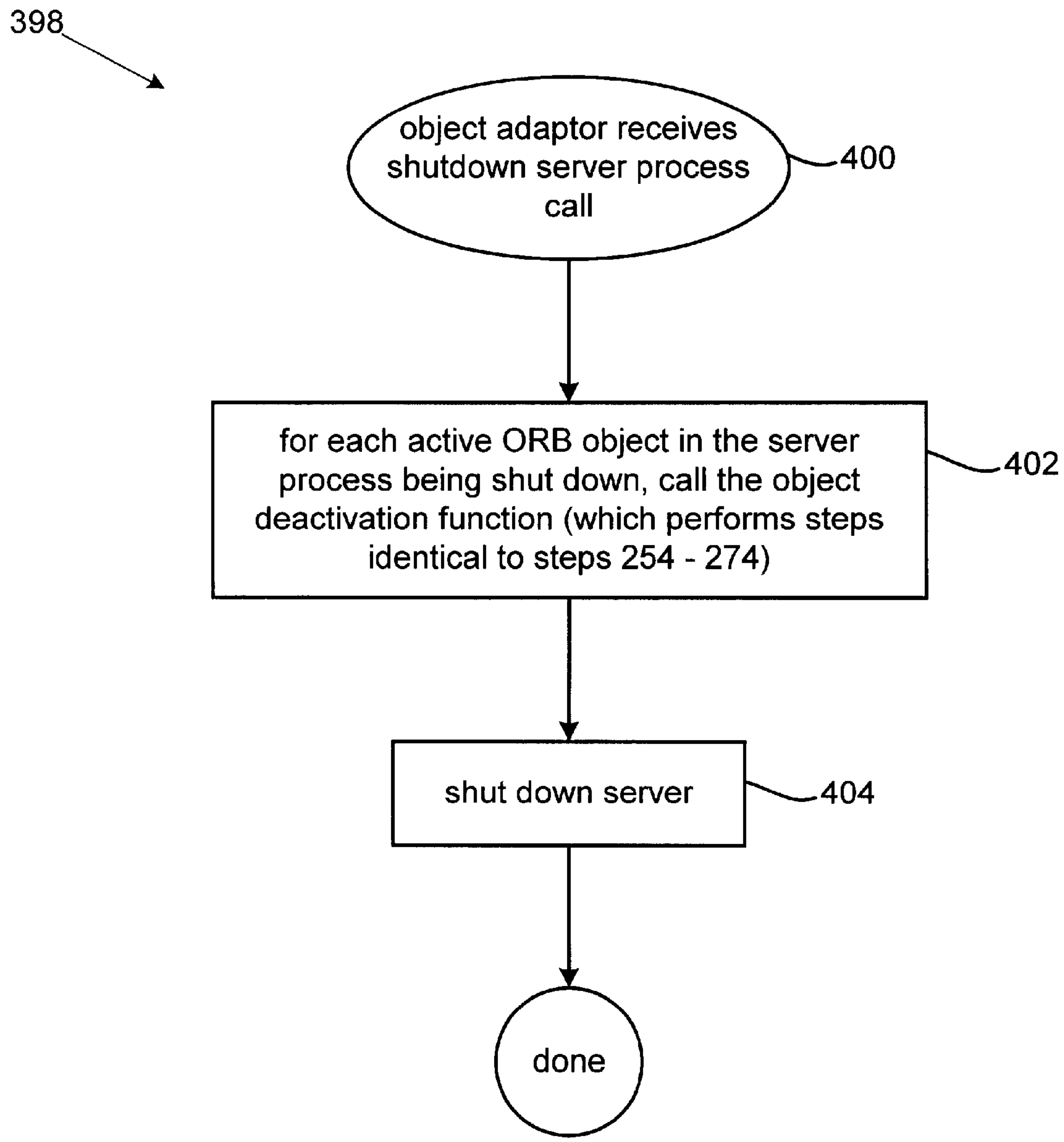
FIG. 9 is a flow chart illustrating a method for an object adapter to shutdown a server process in accordance with one aspect of the present invention.

Referring next to FIG. 8, the server process reaping step 154 of FIG. 4 will be described in more detail. Initially, in a step 352 a determination is made as to whether a server time out variable is set to zero. If so, the server is not to be shut down based on inactivity and no reaping is done of the server process. Accordingly, the server reaping step is completed and the reaper thread will proceed to steps 156 and 158 of FIG. 4 where it will delay before repeating the reaper thread cycle.

If the determination in step 352 is that a server time out variable is not set to zero, the reaper thread will proceed to step 354 where it determines whether the server timer variable is equal to zero. The server timer variable is typically set to zero by two separate occurrences. Initially, when a server process is activated, the server timer variable is set to zero. Additionally, each time that the server process is accessed (as for example would happen on the occurrence of any request to any object that resides in the process), the server timer variable is reset to zero. Thus, a zero value in the server timer variable indicates that this is the first pass of the reaper since the process was either started or accessed. Accordingly, the server timer variable is set to the current time and the reaping of the server process is complete. It should be appreciated that when the server timer variable is set to zero, the current pass of the reaper thread is the first pass since the server was activated or accessed and accordingly step 360 is merely initiating or reinitiating the timer.

When the determination in step 354 is that the server timer variable is not equal to zero, the reaper thread passes to step 356 where it determines whether the amount of time that is elapsed since the server was last accessed exceeds the amount of time allotted in the server time out variable. That is, does the value of the current time minus the value of the server timer variable exceed the value of the server time out variable. If not, the server reaping step is completed.

When it is determined in step 356 that the server has not been accessed in the allotted amount of time, the server process will be deactivated. To facilitate deactivation, the reaper thread will make a call to the object adapter in step 358 requesting that the object adapter initiate the shutdown server process. Accordingly, the mechanics of the shut down server process will not be described in detail herein. However, one thing that needs to be done before the server shutdown is that all of the active objects must be deactivated.

It should be appreciated that at the time the server process is to be shut down, there may be active objects that have been registered with the object request broker (ORB). Accordingly, it is desirable to inform the object request broker of their impending deactivation. Of course, the actual deactivation procedure can be handled in any suitable manner and will vary to a great extent in accordance with the nature of the particular system. In the described embodiment, this ORB level object deactivation is handled by an object deactivation function that is available to the object adapter. Thus, referring next to FIG. 9, one method 398 by which the object adapter (OA) may respond to a shutdown server request will be briefly described. The method 398 begins when the OA receives a shutdown server process call in step 400. By way of explanation, this method would be suitable to perform in response to the call for server shutdown step 358 of FIG. 8. After receiving the shutdown call, the object deactivation function is called for each and every object listed in the active object list. Steps identical to steps 254–274 of FIG. 6 have been found to work well as an object deactivation function. In some embodiments, identical code could called upon in both step 402 and steps 254–275 of FIG. 6. Then, after all the objects in the server process have been deactivated, the server could be shutdown in a step 404. Server shutdown essentially releases the system resources which the server process has been utilizing, making the resources available to other computer entities.

Figure 10:
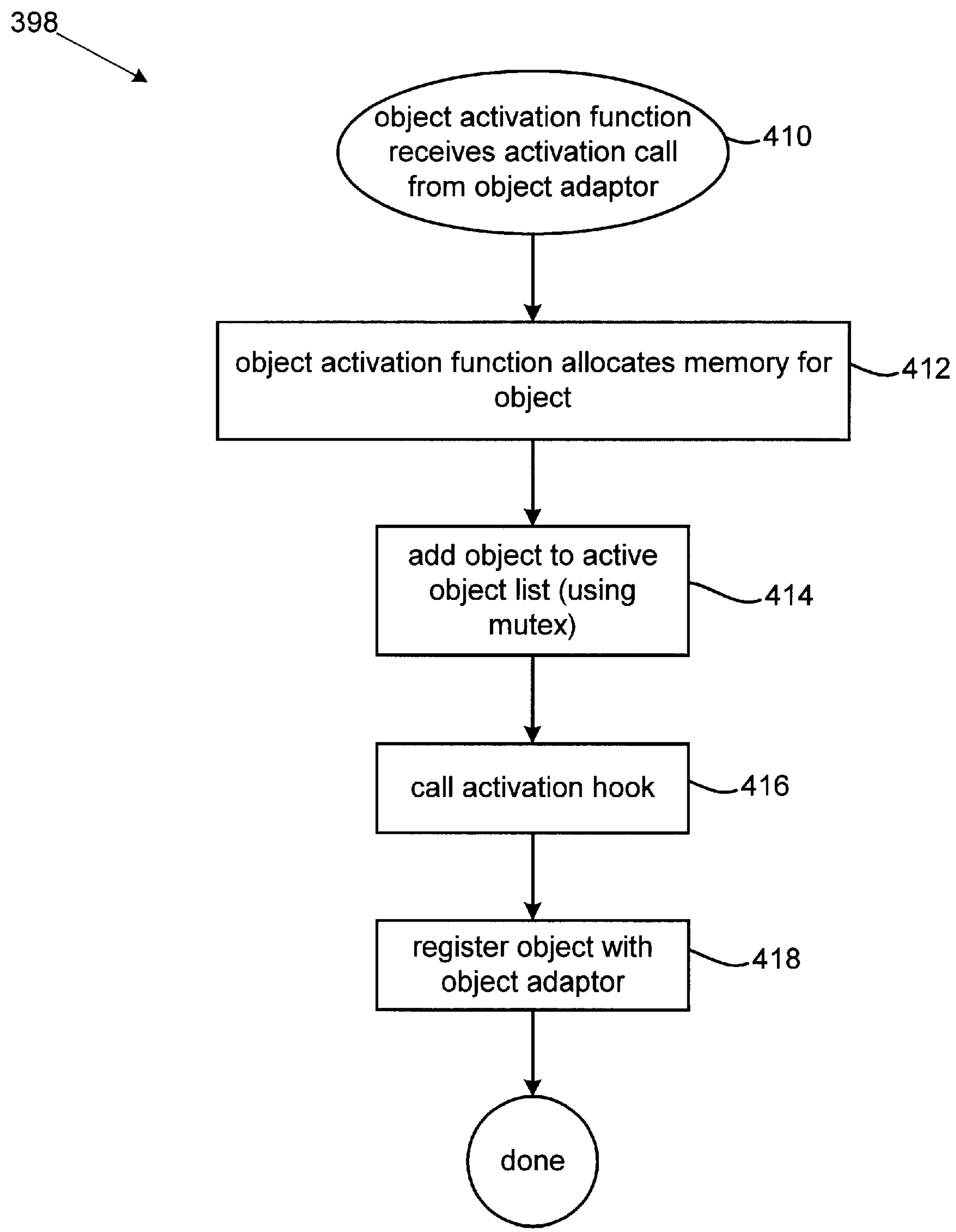
FIG. 10 is a flow chart illustrating a method for activating an object in accordance with one aspect of the present invention.

Referring next to FIG. 10, one suitable method for activating an object in accordance with one embodiment of the present invention will be described in detail now. In a first step 410, an object activation function receives an activation call from the Object Adapter (OA). For example, a client may invoke an object to request a service but the object may not be active. In response to this invocation, the OA must activate the object. Initially, the object activation function will allocate memory for the object in the process. As will be appreciated by those skilled in the art of object oriented programming, typically an entity called a constructor is executed to create an instance of the object class. Once the memory is allocated, in a step 414 the OA adds the object to the active object list. Similar to previously described active object list interactions, the OA will lock and unlock the mutex appropriately. Next, in a step 416, the OA will call the object activation hook. The activation hook is defined to implement any steps required by the object at activation. The activation hook may be provided by suitable entities such as the object developer. Typical steps include initializing data and executing any persistent data storage mechanisms. Once the activation hook has been executed, the object is registered with the OA and is thus ready to accept client requests.

Although only one embodiment of the present invention has been described, it should be understood that the present invention may be embodied in many other specific forms without departing from the spirit or scope of the invention. Particularly, the mutex mechanism described for use in synchronizing access to the active object list may be implemented through other well known techniques. For example, read/write locks are another suitable form of synchronization variables which may be used to control access to the active object list.

In addition, the reader will understand that the sequencing of steps in many of the disclosed methods could be rearranged and still accomplish the intended goals of the present invention. For instance, the specification has described that within the reaping object method of FIG. 5 the reaper thread first processes the active object list and then processes the deactivation pending list. However, switching the order so that first the deactivation pending list is processed and then the active object list is processed will accomplish the intended result.

Furthermore, although the invention has been described in the context of object deactivations that result from delay periods based on time delays, it should be appreciated that the delay periods could alternatively be based on other discernible factors such as the number of times an object or a server has been accessed. For example, an active object may maintain a counter indicating the number of times the object has been used during a predefined period of lapsed time. If the number fell below some predetermined threshold, then the object would be reaped.

Therefore, the present examples are to be considered as illustrative and not restrictive, and the invention is not to be limited to the details given herein, but may be modified within the scope of the appended claims.

What is claimed is:

1. A computer system capable of executing a multi-threaded process, the computer system comprising:
- a central processing unit;
- memory that is allocated to the process;
- an active object list resident in the memory, the active object list being arranged to identify all objects that are active in the process, such objects residing in the memory that is allocated to the process, wherein each active object is identified by a corresponding object entry in the active object list, wherein each object entry includes,
  - an object timeout variable arranged to store an object inactivity period value that is based upon the requirements of the particular active object identified by the object entry, wherein the object inactivity period indicates a period of inactivity after which the particular active object is deactivated,
  - an associated object timer variable arranged to store a value that is suitable for use in determining whether the period of inactivity after which the particular active object is deactivated has been exceeded, and
  - an associated deletion flag that is arranged to indicate whether its associated active object is to be deleted;
- wherein each of the object inactivity period values included in the active object list are designated based upon the particular amount of time each of the associated active objects must be inactive in order to be automatically deactivated, and wherein the object inactivity period values included in the active object list can be different from one another;
- an active object list mutex that permits only one thread to access the active object list at any time;

a process timeout variable arranged to store a designated process inactivity period value that is associated with the process, the designated process inactivity period value being indicative of a period of process inactivity after which the process is deactivated;

a process timer variable associated with the process and arranged to store a value that is suitable for use in determining whether the period of process inactivity after which the process is deactivated has been exceeded; and a reaper for deactivating the selected active object when it is determined that the period of inactivity after which the selected object is deactivated has been exceeded, and when it has been determined that all active objects in the active object list that are identified by a corresponding deletion flag have been deactivated by the reaper, then reaping the process if it has been determined that the period of process inactivity after which the process will be deactivated has been exceeded.

2. A computer system as recited in claim 1 further comprising a deactivation pending list that identifies any objects that are ready to be deactivated and wherein the deactivator is arranged to only deactivate objects that are identified in the deactivation pending list.

* * * * *